United States Patent

Ito

[11] Patent Number: 5,926,952
[45] Date of Patent: *Jul. 27, 1999

[54] METHOD OF FABRICATING A CONNECTOR USING A PRE-MOLDED CONNECTOR STRUCTURE

[75] Inventor: Katsuya Ito, Yokkaichi, Japan

[73] Assignee: Sumitomo Wiring Systems, Ltd., Yokkaichi, Japan

[*] Notice: This patent is subject to a terminal disclaimer.

[21] Appl. No.: 08/886,046

[22] Filed: Jul. 3, 1997

Related U.S. Application Data

[63] Continuation of application No. 08/608,947, Feb. 29, 1996, abandoned, which is a continuation of application No. 08/322,618, Oct. 13, 1994, abandoned.

[30] Foreign Application Priority Data

Oct. 15, 1993 [JP] Japan .................................. 5-281715

[51] Int. Cl.$^6$ ............................ H01R 43/24; H01R 13/40
[52] U.S. Cl. ................................ 29/883; 29/856; 29/858; 29/DIG. 29; 264/264; 264/272.15; 439/606; 439/736
[58] Field of Search .............................. 29/856, 858, 874, 29/883, DIG. 29; 264/264, 272.11, 272.14, 272.15; 439/587, 604, 606, 736

[56] References Cited

U.S. PATENT DOCUMENTS

| 4,293,182 | 10/1981 | Schwartz .............................. 439/736 X |
| 4,430,285 | 2/1984 | Runyan et al. ...................... 264/264 X |
| 4,574,474 | 3/1986 | Langham ................................ 29/858 |
| 4,737,124 | 4/1988 | Ezure et al. ........................ 439/604 X |
| 4,815,983 | 3/1989 | Erickson et al. ................... 439/172 X |
| 4,961,713 | 10/1990 | McCracken et al. .................... 439/587 |
| 5,483,743 | 1/1996 | Armogan et al. ......................... 29/883 |
| 5,724,730 | 3/1998 | Tanaka .................................. 29/858 X |

FOREIGN PATENT DOCUMENTS

| 28 03 071 | 8/1978 | Denmark . |
| 2 662 113 | 11/1991 | France . |
| 3040282 | 2/1988 | Japan ...................................... 29/858 |
| 4-60309 | 9/1992 | Japan . |
| 4-354354 | 12/1992 | Japan . |
| 2232017 | 11/1990 | United Kingdom ...................... 29/883 |

*Primary Examiner*—Peter Vo
*Attorney, Agent, or Firm*—Oliff & Berridge, PLC

[57] ABSTRACT

In a method of producing a connector in which a metal terminal is supported by a core, and then a resin is molded around the core: the metal terminal is covered by a tubular member into which the metal terminal can be inserted, and a tubular distal end edge portion of the tubular portion is pressed against a surface of the core to thereby seal the metal terminal; and the resin is molded around the core.

2 Claims, 5 Drawing Sheets

METHOD OF FABRICATING A CONNECTOR USING A PRE-MOLDED CONNECTOR STRUCTURE

This is a continuation of application Ser. No. 08/608,947 filed Feb. 29, 1996 now abandoned, which in turn is a continuation application of 08/322,618, filed Oct. 13, 1994, now abandoned.

BACKGROUND OF THE INVENTION

1. Field of the Invention

This invention relates to a connector produced by double molding, and also to a method of producing the same.

2. Description of Prior Art

One known conventional method of producing a connector is one using double molding. FIGS. 7 and 8 shows a method of producing a connector by double molding.

As shown in FIG. 7, there are used three mold members 1 to 3 for forming an outer shape of a connector, that is, the left and right mold members 1 and 2 movable left and right apart from each other, and the lower mold member 3. Metal terminal insertion holes 1a for respectively receiving one ends 5a of metal terminals 5 supported by a core 4 are formed in the left mold member 1. Metal terminal insertion holes 3a for respectively receiving the other ends 5b of the metal terminals 5 supported by the core 4 are formed in the lower mold member 3.

When double molding is to be carried out using these mold members 1 to 3, the metal terminals 5 are beforehand supported by the core 4, and the one ends 5a of the metal terminals 5 are inserted respectively into the metal terminal insertion holes 1a in the left mold member 1 while the other ends 5b are inserted respectively into the metal terminal insertion holes 3a in the lower mold member 3. Then, after the core 4 is sealingly surrounded by the three mold members 1 to 3, a resin is filled in this sealed space around the core. After the resin is hardened, the mold is opened to take out the double molded connector.

In the above conventional connector production method, the opposite ends 5a and 5b of the metal terminals 5 are to be electrically contacted with and connected to their respective mating terminals, and therefore the resin should not deposit on the surfaces of these terminal ends. For this reason, if a gap between the metal terminal insertion hole 1a, 3a and the metal terminal 5 is decreased, the metal terminals can not be inserted easily when they are set on the mold members 1 and 3, and the surfaces of the metal terminals are liable to be damaged, and a plated film is liable to be peeled off. In contrast, if the gap between the metal terminal insertion hole 1a, 3a and the metal terminal 5 is increased, the resin flows into the gap, so that the resin deposits on the surface of the metal terminal 5, thus causing an incomplete contact. Therefore, the resin, thus flowed into the gap and solidified, must be removed.

There are occasions when the quality required for the material of the core 4 is different from the quality required for the material of the resin around the core, and when the metal terminals 5 are supported also by the resin around the core as in the conventional construction, it is also essential for this resin to have an insulative property.

SUMMARY OF THE INVENTION

The present invention has been made in view of the above problems, and an object of the invention is to provide a method of producing a connector which facilitates a production process, and also to provide a connector in which the range of materials to be used is increased.

According to one aspect of the invention, there is a provision of a method of producing a connector in which a metal terminal is supported by a core, and then a resin is molded around the core; wherein the metal terminal is covered by a tubular member into which the metal terminal can be inserted, and a tubular distal end edge portion of the tubular portion is pressed against a surface of the core to thereby seal the metal terminal; and the resin is molded around the core.

According to another aspect of the invention, there is a provision of a connector formed by molding a resin around a core supporting a metal terminal; wherein that portion of the core from which the metal terminal is projected is exposed.

In the first aspect of the invention, the tubular member completely covers the metal terminal, and the tubular distal end edge portion is pressed against the surface of the core, so that the metal terminal is sealed. Therefore, when the resin is filled in a space around the core, the resin will not deposit on the peripheral surface of the metal terminal. Since this tubular member does not need to be held in intimate contact with the metal terminal, the tubular member can loosely cover the metal terminal easily, and when removing the tubular member from the metal terminal, it will not damage the metal terminal.

In the second aspect of the invention, that portion of the surface of the core from which the metal terminal is projected is exposed, and the metal terminal is not in contact with the resin around the core. Therefore, the resin around the core does not need to be non-conductive, and different materials to meet properties required respectively for the core and the portion around the core can be selected.

As described above, in the first aspect of the invention, by merely covering the metal terminal with the tubular member, the metal terminal can be isolated from the resin around the core. Therefore, there can be provided the connector production method in which time and labor required for attachment and removal are reduced, and the intrusion of the resin through a gap is prevented, thus enhancing an operation efficiency.

In the second aspect of the invention, for example, the core is formed of an insulating material having a high holding force, and the outer peripheral portion around the core is formed of a material which is less liable to crack and has conductivity. Thus, different materials to meet properties required respectively for the core and the outer peripheral portion around the core can be selected.

DETAILED DESCRIPTION OF THE PREFERRED EMBODIMENTS

A preferred embodiment of the present invention will now be described with reference to the drawings.

Figure 1:
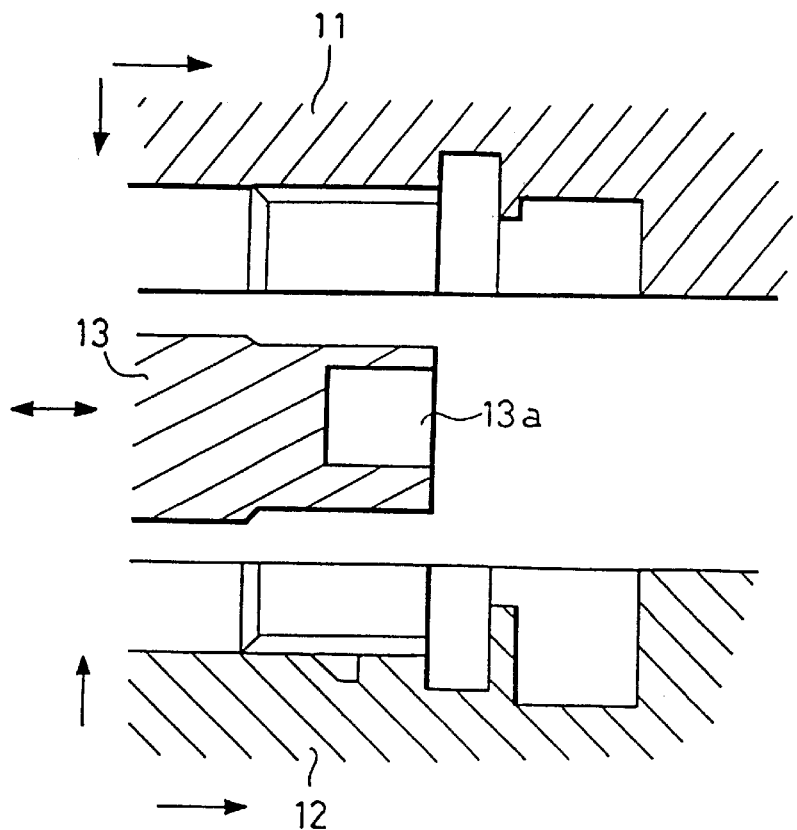
FIG. 1 is a cross-sectional view of a mold, showing a process of the production of a connector.
Figure 2:
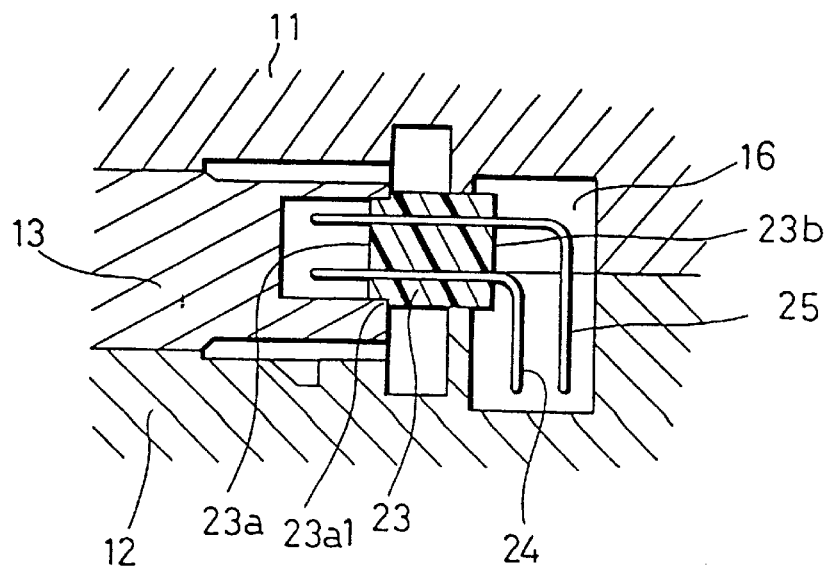
FIG. 2 is a cross-sectional view of the mold, showing a condition in which a core is supported in the mold.
Figure 3:
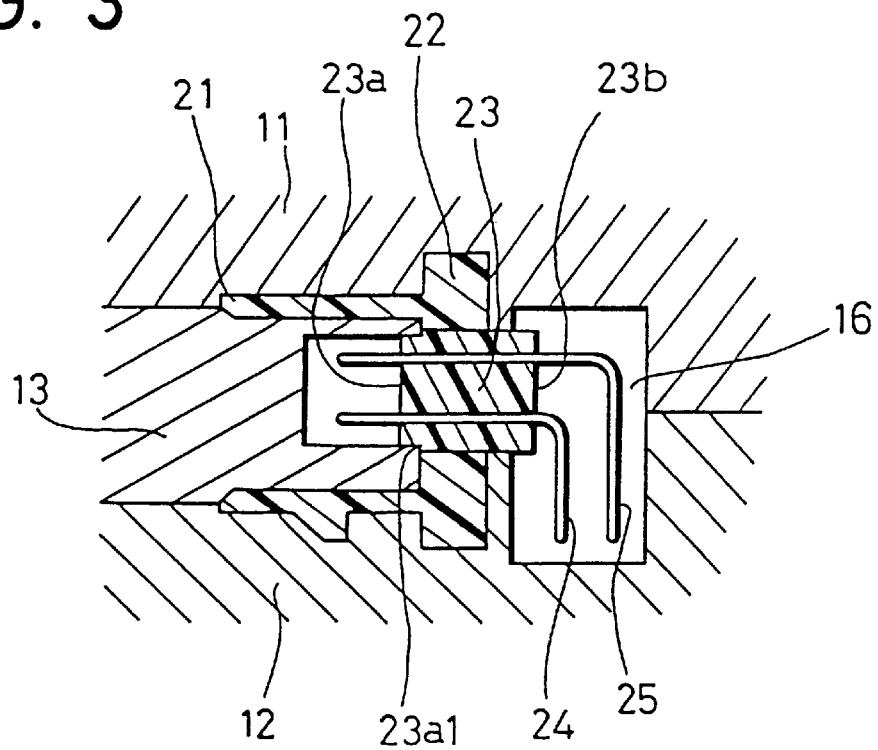
FIG. 3 is a cross-sectional view of the mold, showing a condition in which a resin is filled in a space around the core.
Figure 4:
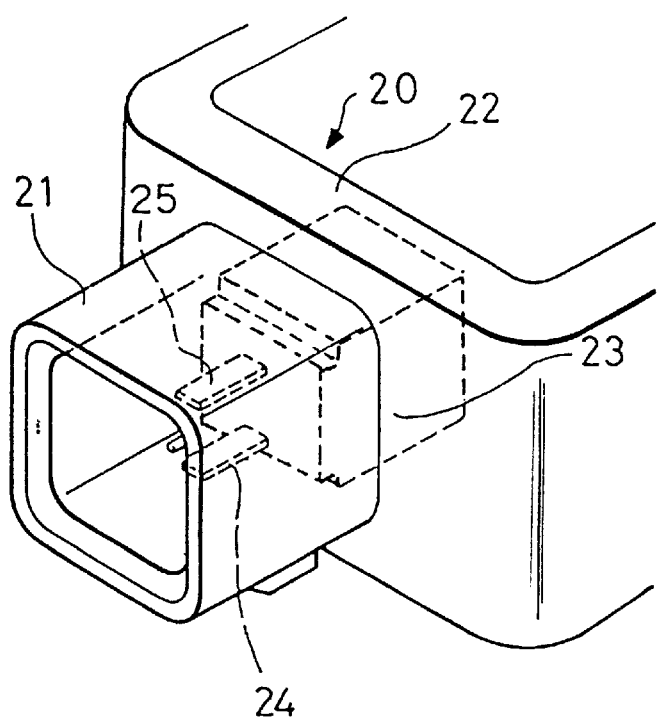
FIG. 4 is a perspective view of the molded connector.

FIGS. 1 to 3 are cross-sectional views showing a method of producing a connector shown in FIG. 4.

In these Figures, an upper mold member 11 and a lower mold member 12 are movable upward and downward for holding an intermediate mold member 13 therebetween, and a hood portion 21 of the connector 20 is formed by a gap formed between the upper and lower mold members and the outer periphery of the intermediate mold member 13. The intermediate mold member 13 has a tubular portion 13a open in a right-hand direction (these Figures).

The upper and lower mold members 11 and 12 jointly form a space at their central portions in intimate contact with the outer periphery of a core 23 in surrounding relation thereto, this space serving to form a flange 22. The upper and lower mold members also jointly form a tubular cavity 16 at their right side portions which cavity is disposed at the right side of the core 23.

The core 23 is molded of a first resin of a non-conductive nature, and has a square cross-section, and this core has two metal terminals 24 and 25 press-fitted therein, as shown in FIG. 3. A step portion 23a1 is formed on a peripheral edge portion of a left face 23a of the core, and this step portion 23a1 is adapted to fit in an open end of the tubular portion 13a of the intermediate mold member 13.

A method of producing the connector using the mold members will now be described.

The metal terminals 24 and 25 are beforehand press-fitted in the core 23 molded of the first resin in such a manner that these metal terminals extend through a right face 23b and the left face 23a. The mold members 11 and 12 are held in a spaced-apart condition as shown in FIG. 1, and the metal terminals 24 and 25 extending from the left face 23a of the core 23 are inserted into the tubular portion 13a of the intermediate mold member 13. The interior of the tubular portion 13a is sufficiently wide with respect to the metal terminals 24 and 25, extending from the core 23, that the two terminals 24 and 25 can be easily inserted thereinto without being damaged.

These terminals are inserted until the left face 23a of the core 23 closes the open end of the tubular portion 13a, so that the step portion 23a1 closely fits in the open end of the tubular portion 13a to thereby seal the interior thereof. Thus, the core 23 is provisionally supported on the intermediate mold member 13, and then the upper and lower mold members 11 and 12 are moved toward each other to hold the intermediate mold member 13 therebetween. When the intermediate mold member 13 is held between the upper and lower mold members 11 and 12, the gap corresponding to the hood portion 21 is formed around the intermediate mold member 13, and the gap corresponding to the flange 22 is formed around the intermediate portion of the core 23. The right side portions of the upper and lower mold members 11 and 12 form the cavity receiving the metal terminals 24 and 25 extending from the right face 23b of the core 23, and are held in close contact with the outer periphery of the right side portion of the core 23.

Thus, the gap corresponding to the flange 22 is formed around the intermediate portion of the core 23, and the gap, which corresponds to the hood portion 21 and is communicated with this gap, is formed around the core 23. However, the interior of the tubular portion 13a of the intermediate mold member 13 is closed by the left face 23a of the core 23, and is not communicated with these gaps. A second resin, which has conductivity, and has such elasticity as to hardly suffer from a crack, is filled in these gaps, and after this resin is hardened, the mold members 11 to 13 are moved apart from one another to take out the connector 20 shown in FIG. 4. At this time, although the intermediate mold member 13 must be withdrawn from the connector 20, there is no fear that the metal terminals 24 and 25 are damaged.

Figure 5:
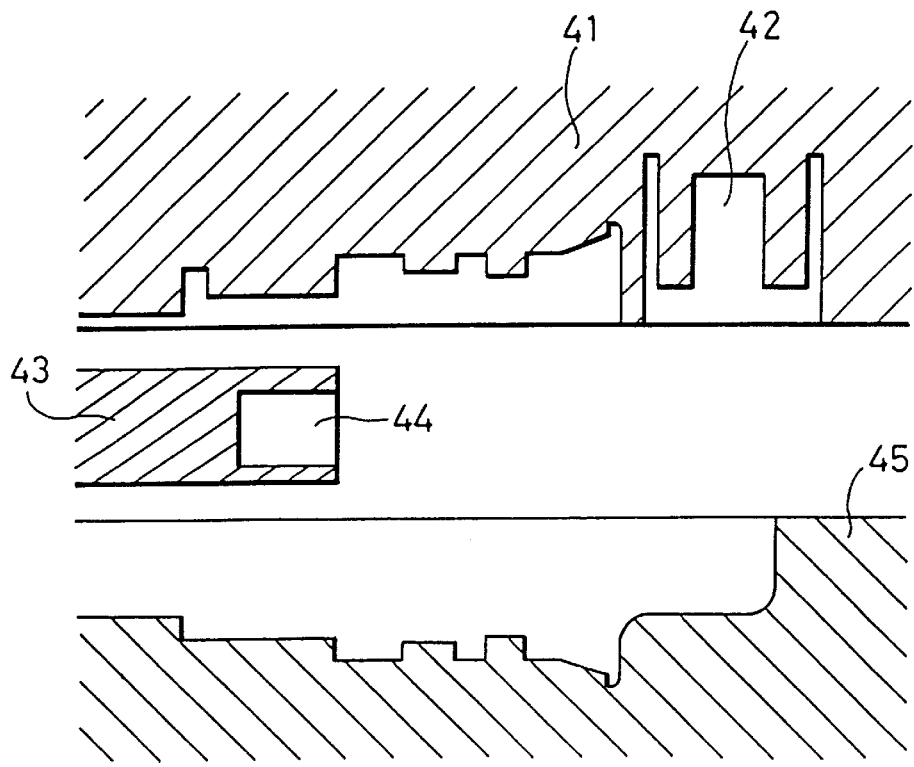
FIG. 5 is a cross-sectional view of another mold, showing a process of the production of a connector.
Figure 6:
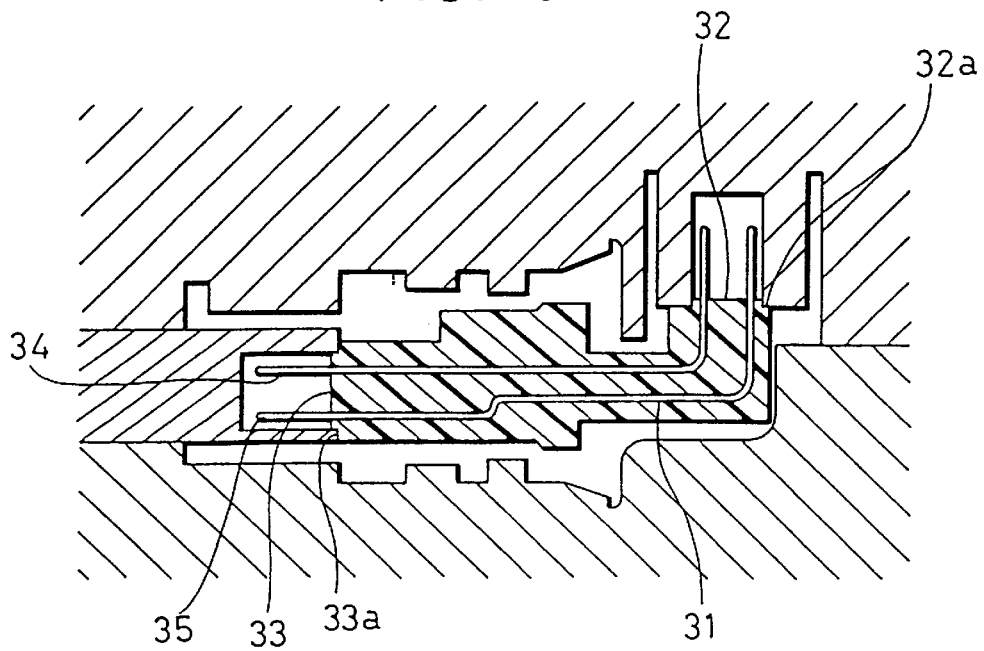
FIG. 6 is a cross-sectional view of the mold, showing a condition in which a core is supported in the mold.
Figure 7:
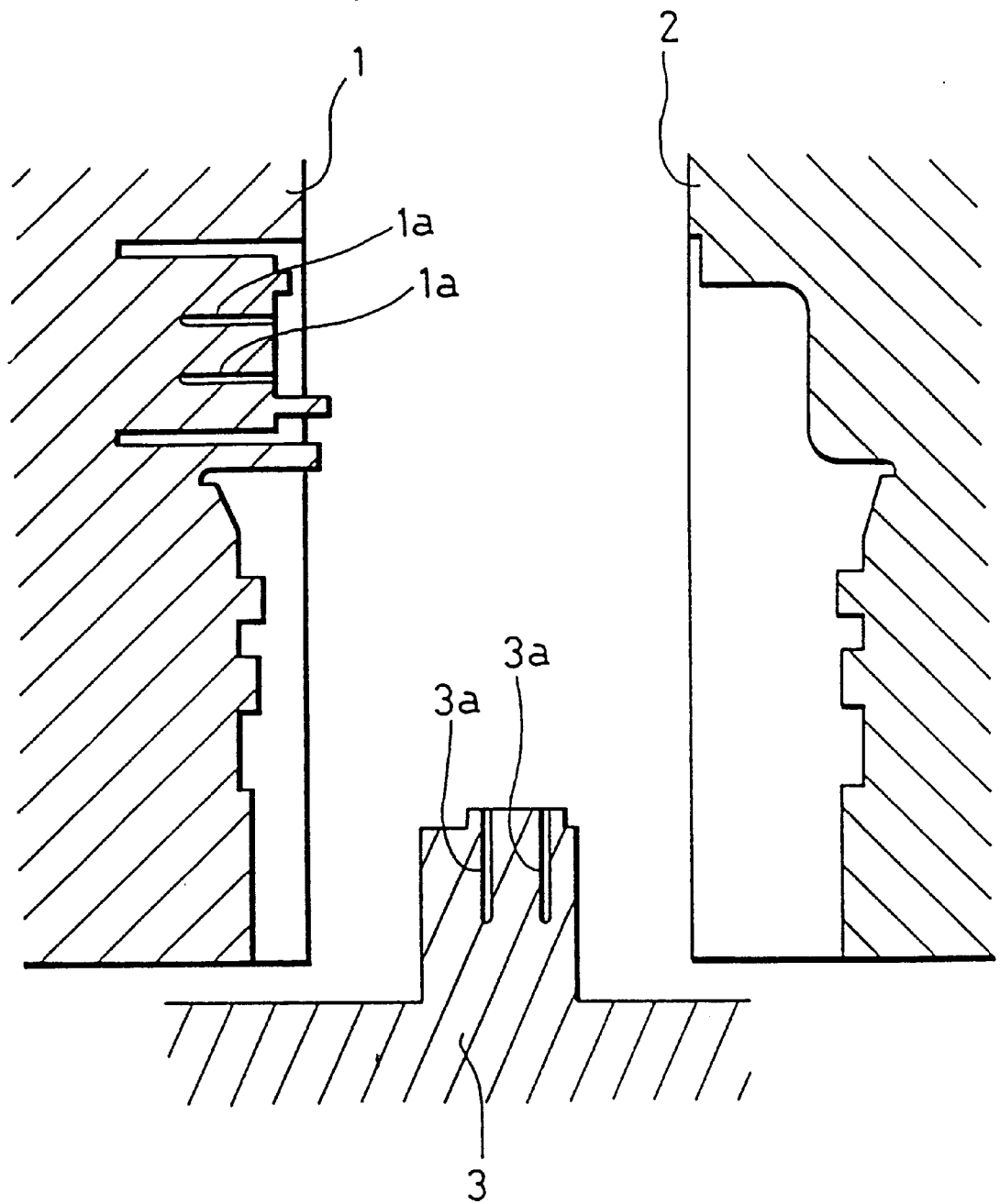
FIG. 7 is a cross-sectional view of a conventional mold.
Figure 8:
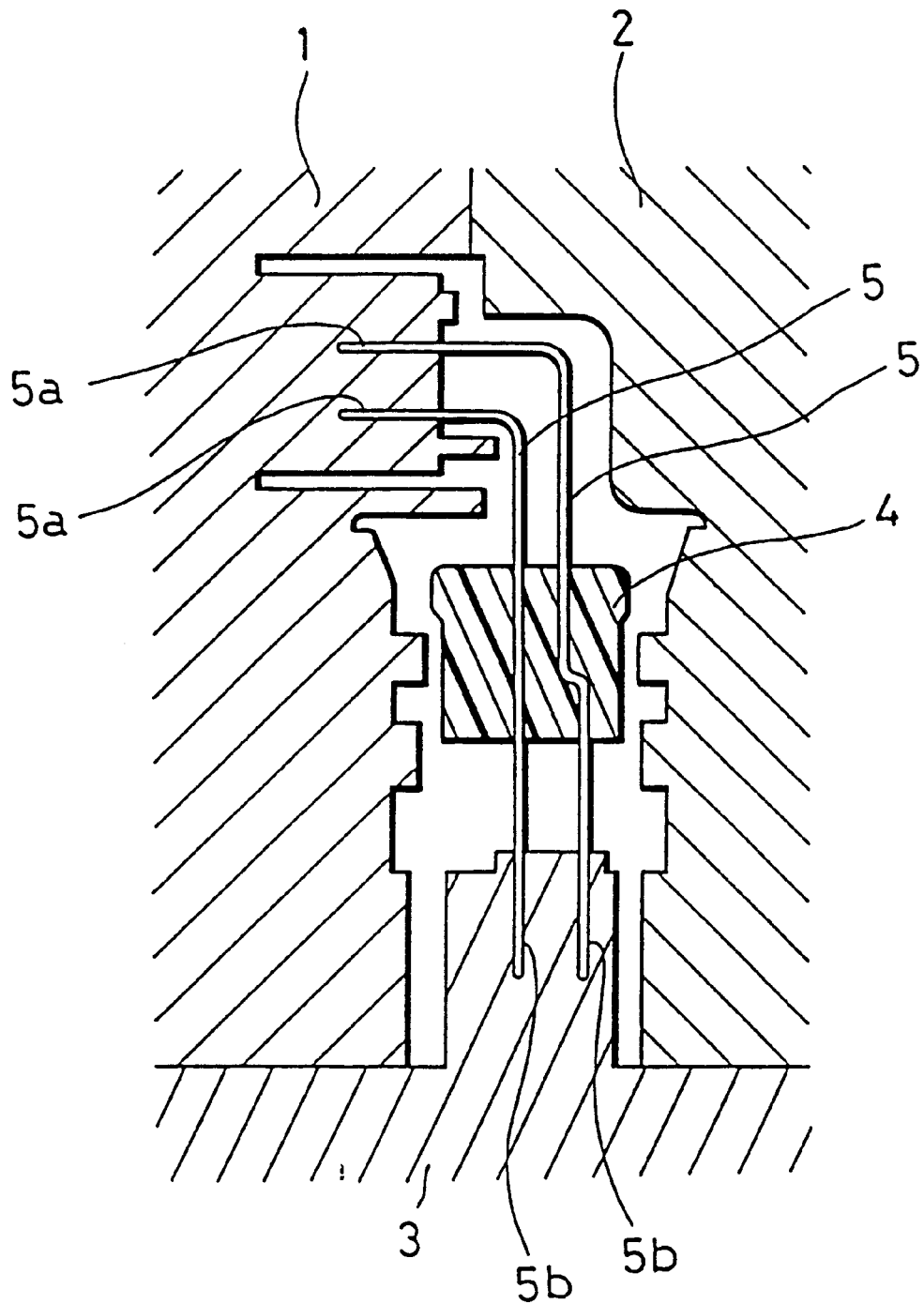
FIG. 8 is a cross-sectional view of the conventional mold, showing a condition in which a core is supported in the mold.

FIGS. 5 and 6 show another embodiment of a method of producing a connector.

In this case, also, opposite end portions of metal terminals 34 and 35 extend from end faces 32 and 33 of a core 31, and step portions 32a and 33a are formed in peripheral edge portions of the end faces 32 and 33, respectively. A tubular recess 42 is formed in an upper mold member 41, and faces the right upper end face 32. A tubular portion 44 is formed at an intermediate mold member 43, and faces the left end face 33 of the core 31. The step portions 32a and 33a, formed respectively on the opposite end faces 32 and 33 of the core 31, can be fitted respectively in the recess 42 and the tubular portion 44 to seal the interiors thereof.

The upper mold member 41, the intermediate mold member 43 and a lower mold member 45 are movable from a spaced-apart condition (FIG. 5) to a condition (FIG. 6) in which these mold members sealingly surround the core 31. First, the end portions of the metal terminals 34 and 35, extending from the end face 33, are inserted into the tubular portion 44 of the intermediate mold member 43, and the end face 33 is sealingly fitted in the edge of the open end of the tubular portion 44. Then, the upper mold member 41 is moved downward, and the end portions of the metal terminals 34 and 35, extending from the end face 32 of the core 31, are inserted into the recess 42 in the upper mold member 41, and the end face 32 is sealingly fitted in the edge of the open end of the recess 42. Finally, the lower mold member 45 is moved upward, thereby forming a sealed gap around the core 31, and a resin is filled in this gap, and is hardened. After the resin is hardened, the mold members 41, 43 and 45 are moved apart from one anther to take out the connector.

As described above, the metal terminals 24 and 25 (34 and 35) extending from the core 23 (31) are covered by the tubular portions (the tubular portion 13a, the recess 42, the tubular portion 44) of the mold (the intermediate mold member 13, the upper mold member 41, the intermediate mold member 43), and the open ends of the tubular portions are pressed against the end faces (the left face 23a, the end faces 32 and 33) of the core to seal the interiors thereof, and thereafter a resin is molded around the core. With this arrangement, the resin will not deposit on the metal terminals 24 and 25 (34 and 35) without damaging the metal terminals, and besides the production process is rendered easy. The resin around the core is thus prevented from contact with those portions of the metal terminals 24 and 25 (34 and 35) extending from the core 23 (31), and therefore suitable resins can be selected respectively for the core 23 (31) and that portion around the core.

What is claimed is:

1. A method of fabricating a connector, comprising the steps of:

providing a pre-molded connector structure including at least one terminal connected to and projecting from a core;

providing a mold device including at least two mold members with each mold member having a cavity formed therein;

enveloping the pre-molded connector structure within the respective cavities of the at least two mold members whereby the core of the pre-molded connector structure and the at least two mold members contact each other to form a molding cavity about a molding portion of the core and a receiving cavity sized to receive a non-molding portion of the core and the at least one terminal without the at least one terminal contacting the at least two mold members; and causing a molten molding material to enter into and occupy the molding cavity without the molten molding material migrating into the receiving cavity.

2. A method of fabricating a connector, comprising the steps of:

providing a pre-molded terminal structure including a core and at least one terminal connected to and extending through the core, the terminal having a first terminal end section projecting from one surface of the core and a second terminal end section projecting from another surface of the core;

providing a mold device including a first mold member, a second mold member and a third mold member, each of the first, second and third mold members having a cavity formed therein;

enveloping the pre-molded terminal structure within the respective cavities of the first, second and third mold members whereby respective ones of two of the first, second and third mold members contact the core of the pre-molded connector structure and form respective receiving cavities about the first and second terminal end sections of the terminal without the first and second terminal end sections contacting the respective ones of the two of the first, second and third mold members and a remaining one of the first, second and third mold members contacting respective ones of the two of the first, second and third mold members to form a molding cavity about the core; and causing a molten molding material to enter into and occupy the molding cavity whereby the receiving cavities are isolated from the molding cavity in a manner to prevent migration of the molten molding material into either one of the receiving cavities.

* * * * *